UNITED STATES PATENT OFFICE.

FREDERICK BREDEL, OF MILWAUKEE, WISCONSIN.

PROCESS OF IMPROVING QUALITY AND INCREASING QUANTITY OF ILLUMINATING COAL-GAS.

SPECIFICATION forming part of Letters Patent No. 635,911, dated October 31, 1899.

Application filed January 7, 1899. Serial No. 701,475. (No specimens.)

*To all whom it may concern:*

Be it known that I, FREDERICK BREDEL, a citizen of the United States, residing at Milwaukee, in the county of Milwaukee and State of Wisconsin, have invented certain new and useful Improvements in Processes of Improving the Quality and Increasing the Quantity of Illuminating Coal-Gas; and I do declare the following to be a full, clear, and exact description of the invention, such as will enable others skilled in the art to which it appertains to make and use the same.

This invention relates to certain new and useful improvements in methods or processes for improving the quality and increasing the quantity of illuminating coal-gas.

To this end and to such others as the invention may pertain, the same consists in the steps hereinafter specified, which steps when taken in the order described constitute my improved method or process for accomplishing the objects mentioned.

It is well known to those skilled in the art pertaining to the manufacture of illuminating coal-gas that such gas has generally been enriched by mixing with the gas vapors of hydrocarbon. While this process in a certain sense improves the quality of the gas, it is open to certain objections due to the fact that the flame produced in burning gas which has been so enriched flickers and smokes, this being due to the fact that the hydrocarbon vapors are not fixed gases.

Another process that has been employed for increasing the candle-power of coal-gas consists in passing the gas as soon as it leaves the retorts through another independent and so-called "superheating" retort; but this process has been found to be impractical for the following reasons: The coal-gas contains a considerable quantity of water-vapors as well as ammonia-vapors, which in the presence of carbon will be decomposed while passing through a heated retort. The water-vapors are decomposed into their elements, hydrogen and oxygen, which latter forms with the carbon monoxid carbonic acid, and as this latter is a non-combustible gas it serves to diminish the illuminating power of the gas in such a degree that any possible advantages obtained by increasing the candle-power by this process are nullified by the presence of the carbonic acid. The ammonia present is also partially destroyed. Lampblack and retort-carbon are also formed in quantities which make the process undesirable. Without taking into consideration the aforesaid disadvantages, this process is impractical from a commercial point of view, as a very large amount of desirable by-products (ammonia and tar) is destroyed, and the process also facilitates and is directly responsible for the occurrence of obnoxious stoppages in the gas-mains.

The essential object of the present invention is to overcome all these defects and to obtain a higher candle-power.

The process consists in passing dry purified coal-gas through one or more hot retorts. The temperature of these retorts should be from dark to bright cherry red, according to the quantity of gas passed through the retort. By "dry purified or purified gas" is meant such gas as has passed the ordinary iron, manganese, or lime purifier. The generally-accepted theory is that by passing so-called "heavy hydrocarbons," as propylene, butylene, styrol, or naphthalene, through hot retorts the aforesaid hydrocarbons would be decomposed and that the benzol present would also be destroyed. This might be true when the gas is passed by itself alone or if contained in unpurified gas or, in other words, in the presence of water-vapor and carbonic acid; but I have discovered that purified coal-gas or such gas as contains practically no water-vapor or ammonia or sulfureted hydrogen which contains said heavy hydrocarbons acts quite differently and that the gas increases its candle-power instead of losing it by forming other hydrocarbons which have a higher heat of formation and therefore show a higher candle-power when burned in the so-called "flat-flame burner" or the class commonly termed the "Argand" burner.

The process can also be carried out by mixing the purified coal-gas with other rich hydrocarbons, such as naphtha or gasolene vapors, and passing the same through hot retorts, whereby a further large increase in illuminating power is obtained.

The process is carried out in the following manner: Pass ten per cent. or more of purified coal-gas through one or more hot retorts and mix the so-treated reheated gas with the crude gas, preferably ahead of the exhauster. In passing the gas through the hot retorts lighter hydrocarbons are formed than those originally contained in the gas, thereby producing a higher candle-power. These lighter hydrocarbons act again as carriers of the heavy hydrocarbons—such as naphthalene, &c., (which latter have a very high illuminating power,)—and thereby prevent the absorption of the aforesaid heavy hydrocarbon vapors by the tar, and the resulting gas will therefore contain more illuminants than would otherwise be possible for it to contain or carry on account of the admixture of said purified gas, it being an established fact that coal-gas when leaving the hydraulic main is of from twenty-four to twenty-eight candle power; but a large proportion of this candle-power is lost by cooling and washing and purifying the gas, for the reason that there is a lack of sufficient lighter hydrocarbons to carry the heavier. After mixing the gas obtained by passing the purified coal-gas through the hot retorts with crude gas it is finally passed through a cooling and purifying apparatus.

From the foregoing explanations the advantages possessed by my process will be at once evident. Should it be found to be necessary to further increase the candle-power of the gas, the admixture of heavy hydrocarbon vapors—such as benzol, naphtha, or gasolene vapors—becomes necessary. It is advisable to mix these vapors with the gas before it enters the hot retort, and the so-treated gas is then mixed with the crude gas, as heretofore described.

The experiments that I have made show that an increase of candle-power is obtained by passing the purified coal-gas through hot retorts and that when mixing the so-treated reheated gas with crude coal-gas the resulting gas after purification has about the same candle-power as the reheated gas.

I am aware that the so-called "blue water-gas" has been mixed with heavy hydrocarbon vapors and then passed through hot retorts; but this process does not obtain an increase of candle-power in the so-called "blue water-gas" itself, for the reason that the gas consists principally of carbon monoxid, hydrogen, and a small percentage of methan, ($CH_4$,) and therefore has practically no candle-power. In my process I use coal-gas or, in other words, a gas which contains a large amount of different hydrocarbons besides marsh-gas.

Having thus described my invention, what I claim to be new, and desire to secure by Letters Patent, is—

1. The process of increasing the candle-power of coal-gas and at the same time of increasing the quantity of gas produced per pound of coal carbonized, the same consisting in passing the purified coal-gas through hot retorts having a minimum temperature of a dull-red heat, substantially as and for the purpose specified.

2. The process of increasing the candle-power of coal-gas and at the same time of increasing the quantity of gas produced per ton of coal carbonized, which consists in passing the purified coal-gas through hot retorts having a minimum temperature of a dull-red heat, and then mixing the gas thus obtained with crude gas, and finally passing the thus-obtained mixture through the different cooling and purifying apparatus, substantially as described, and for the purpose specified.

In testimony whereof I affix my signature in presence of two witnesses.

FREDERICK BREDEL.

Witnesses:
HENRY F. REILLY,
GEORGE H. KATZ.